United States Patent
Shi et al.

(10) Patent No.: US 10,569,364 B2
(45) Date of Patent: Feb. 25, 2020

(54) SYSTEMS AND METHODS FOR ADDITIVE MANUFACTURING RECOATING

(71) Applicant: General Electric Company, Schenectady, NY (US)

(72) Inventors: Jinjie Shi, Clifton Park, NY (US); David Charles Bogdan, Jr., Charlton, NY (US); William Thomas Carter, Galway, NY (US); Christopher James Hayden, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 15/400,592

(22) Filed: Jan. 6, 2017

(65) Prior Publication Data
US 2018/0194074 A1    Jul. 12, 2018

(51) Int. Cl.
| | |
|---|---|
| *B29C 64/214* | (2017.01) |
| *B23K 26/342* | (2014.01) |
| *B33Y 10/00* | (2015.01) |
| *B29C 64/153* | (2017.01) |
| *B29C 64/20* | (2017.01) |

(Continued)

(52) U.S. Cl.
CPC ............ *B23K 26/342* (2015.10); *B22F 3/004* (2013.01); *B22F 3/1055* (2013.01); *B29C 64/153* (2017.08); *B29C 64/20* (2017.08); *B33Y 10/00* (2014.12); *B22F 2003/1056* (2013.01); *B22F 2003/1057* (2013.01); *B22F 2999/00* (2013.01); *B23K 2103/10* (2018.08);
(Continued)

(58) Field of Classification Search
CPC ...... B23K 26/342; B33Y 10/00; B33Y 30/00; B29C 64/153; B29C 64/20; B29C 64/214; B22F 3/004; B22F 3/1055
See application file for complete search history.

(56) References Cited

U.S. PATENT DOCUMENTS

| | | | |
|---|---|---|---|
| 6,048,487 A | 4/2000 | Almquist et al. | |
| 6,174,156 B1 | 1/2001 | Chapman et al. | |

(Continued)

FOREIGN PATENT DOCUMENTS

| | | |
|---|---|---|
| EP | 2916980 B1 | 6/2016 |
| JP | 5394723 B2 | 1/2014 |
| WO | 2016055386 A1 | 4/2016 |

OTHER PUBLICATIONS

Guangshen et al., "Research on Recoating Process in High-Resolution Stereolithography System", Intelligent Computation Technology and Automation, 2009. ICICTA '09. Second International Conference on, pp. 621-624, Oct. 10-11, 2009.

(Continued)

*Primary Examiner* — Joseph S Del Sole
*Assistant Examiner* — Jamel M Nelson
(74) *Attorney, Agent, or Firm* — Armstrong Teasdale LLP (57) ABSTRACT

A recoating device for an additive manufacturing system includes a plurality of recoater blades which include a first stage and a second stage. The first stage includes a plurality of rows of the plurality of recoater blades and extends in the transverse dimension. The second stage includes a plurality of recoater blades and is configured substantially similar to the first stage of the plurality of recoater blades. The second stage of recoater blades is displaced from the first stage of recoater blades in the vertical dimension.

20 Claims, 5 Drawing Sheets

(51) Int. Cl.
*B22F 3/105* (2006.01)
*B22F 3/00* (2006.01)
*B33Y 30/00* (2015.01)
*B29K 105/00* (2006.01)
*B23K 103/10* (2006.01)
*B23K 103/14* (2006.01)

(52) U.S. Cl.
CPC .... *B23K 2103/14* (2018.08); *B29K 2105/251* (2013.01); *B33Y 30/00* (2014.12)

(56) References Cited

U.S. PATENT DOCUMENTS

| | | | |
|---|---|---|---|
| 6,764,636 B1 * | 7/2004 | Allanic | B29C 41/12 |
| | | | 264/401 |
| 7,047,098 B2 | 5/2006 | Lindemann et al. | |
| 7,621,733 B2 | 11/2009 | Reynolds et al. | |
| 7,736,577 B2 | 6/2010 | Morohoshi et al. | |
| 7,789,037 B2 | 9/2010 | Teulet | |
| 7,871,551 B2 | 1/2011 | Wallgren et al. | |
| 8,308,466 B2 | 11/2012 | Ackelid et al. | |
| 8,568,124 B2 | 10/2013 | Brunermer | |
| 9,079,248 B2 | 7/2015 | Ackelid | |
| 9,126,167 B2 | 9/2015 | Ljungblad | |
| 9,327,451 B2 | 5/2016 | Teulet | |
| 9,403,235 B2 | 8/2016 | Buller et al. | |
| 2002/0152002 A1 * | 10/2002 | Lindemann | B22F 3/1055 |
| | | | 700/119 |
| 2002/0195747 A1 | 12/2002 | Hull et al. | |
| 2014/0265048 A1 | 9/2014 | Burris et al. | |
| 2014/0308153 A1 | 10/2014 | Ljungblad | |
| 2014/0314609 A1 | 10/2014 | Ljungblad et al. | |
| 2015/0071809 A1 | 3/2015 | Nordkvist et al. | |
| 2015/0165524 A1 | 6/2015 | Ljungblad et al. | |
| 2015/0273622 A1 | 10/2015 | Manabe | |
| 2015/0283610 A1 | 10/2015 | Ljungblad et al. | |
| 2016/0059314 A1 | 3/2016 | Ljungblad et al. | |

OTHER PUBLICATIONS

International Search Report and Written Opinion issued in connection with corresponding PCT Application No. PCT/US2017/065036 dated Sep. 21, 2018.

* cited by examiner

SYSTEMS AND METHODS FOR ADDITIVE MANUFACTURING RECOATING

BACKGROUND

The field of the disclosure relates generally to additive manufacturing systems and, more particularly, to systems and methods for recoating a component during the additive manufacturing process.

At least some additive manufacturing systems involve the buildup of a particulate material to make a component. This method can produce complex components from expensive materials at a reduced cost and with improved manufacturing efficiency. At least some known additive manufacturing systems, such as Direct Metal Laser Melting (DMLM), Selective Laser Sintering (SLS), Direct Metal Laser Sintering (DMLS) and LaserCusing systems, fabricate components using a focused energy source, such as a laser device or an electron beam generator, a build platform, and a particulate, such as, without limitation, a powdered metal. The focused energy source device melts the particulate material on the build platform in and around the area where the focused energy source is incident on the particulate material, resulting in a melt pool. The melt pool cools and forms at least a portion of the next layer in the build process.

In systems like DMLM, the particulate material must be spread over the top of the newly formed layer in a process called recoating, layer by layer, as the build progresses. The uniformity of the structural makeup of the component depends on the uniform distribution of the particulate material for each build layer. Evenly distributing the particulate material to form the next build layer is difficult because of many factors, and inhibits rapid production in the additive manufacturing process. Voids in the part resulting from uneven distribution of the particulate material can result in the part being rejected or possibly malfunctioning during use. Additionally, areas of excessive particulate material in the build layer may cause a high spot on the component that then contacts the recoating device, which may result in a decrease in service life.

As the rate of the recoating process increases, the difficulty of creating a uniform particulate-material build layer increases. Dynamic effects within the particulate bed and particle-to-particle momentum transfer become more prevalent. Additionally, aerodynamic effects due to the rapidly moving recoating device add to the complexity of rapid-rate additive manufacturing processes.

BRIEF DESCRIPTION

In one aspect, a recoating device for an additive manufacturing system is provided. The additive manufacturing system defines a longitudinal dimension, a transverse dimension, and a vertical dimension, with the three dimensions being orthogonal to each other. The recoating device includes a plurality of recoater blades which include a first stage of the plurality of recoater blades and a second stage of the plurality of recoater blades. The first stage of the plurality of recoater blades includes a plurality of rows of the plurality of recoater blades and extends in the transverse dimension. The second stage of the plurality of recoater blades is configured substantially similar to the first stage of the plurality of recoater blades. The second stage of the plurality of recoater blades is displaced from the first stage of the plurality of recoater blades in the vertical dimension.

In another aspect, an additive manufacturing system is provided. The additive manufacturing system defines a longitudinal dimension, a transverse dimension, and a vertical dimension, with the three dimensions being orthogonal to each other. The additive manufacturing system includes a powder bed, at least one energy source, and a recoating device. The powder bed is configured to hold a powder for forming a component. The energy source is configured to produce at least one energy beam configured to generate a melt pool in the powder bed. The recoating device is configured to distribute powder for forming a build layer of a component from the powder bed. The recoating device includes a plurality of recoating blades which include a first stage of the plurality of recoater blades and a second stage of the plurality of recoater blades. The first stage of the plurality of recoater blades includes a plurality of rows of the plurality of recoater blades and extends in the transverse dimension. The second stage of the plurality of recoater blades is configured substantially similar to the first stage of the plurality of recoater blades. The second stage of the plurality of recoater blades is displaced from the first stage of the plurality of recoater blades in the vertical dimension.

In yet another aspect, a method of assembling an additive manufacturing system including manufacturing a recoating device is provided. The additive manufacturing system defines a longitudinal dimension, a transverse dimension, and a vertical dimension, the three dimensions orthogonal to each other. The method includes fabricating a plurality of rows of recoater blades extending in the transverse dimension. The method further includes fabricating a first stage of recoater blades by coupling at least a first portion of the plurality of rows of the plurality of recoater blades to each other. The method also includes fabricating a second stage of recoater blades by coupling at least a second portion of the plurality of rows of the plurality of recoater blades to each other. The method further includes configuring the second stage of recoater blades such that it is substantially similar to the first stage of recoater blades. The method includes coupling the first stage of recoater blades and the second stage of recoater blades to the recoating device. The method further includes positioning the second stage of recoater blades such that the second stage of recoater blades is displaced from the first stage of recoater blades in the vertical dimension.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems with a recoating device described herein recoat a component with particulate material during the build process. The additive manufacturing system includes a focused energy source and a recoating device with multiple stages of multiple rows of blades. The focused energy source directs energy to a layer of particulate build material that covers the component being constructed on a build platform. After the build layer is melted by the energy source and allowed to cool, the recoating device spreads particulate material across the component to form the next build layer. The multiple stages of multiple row blades spread the particulate material in a progressive manner. The progressive multiple-stage recoating device decreases build time and cost, and reduces the presence of inconsistencies in the particulate build layer.

Figure 1:
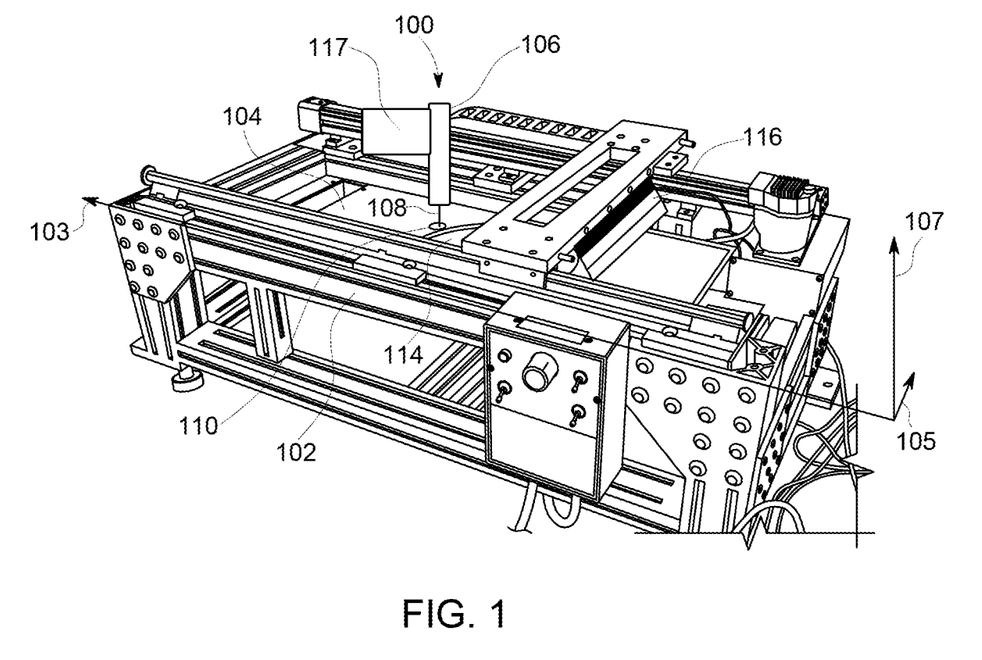
FIG. 1 is a perspective schematic view of an exemplary additive manufacturing system.

FIG. 1 is a perspective view of an exemplary additive manufacturing system 100. In the exemplary embodiment, additive manufacturing system 100 is a direct metal laser melting (DMLM) system. In alternative embodiments, additive manufacturing system 100 is configured for use for any additive manufacturing process that facilitates operation of additive manufacturing system 100 as described herein. For example, in some embodiments, additive manufacturing system 100 is used for any of the following processes: Selective Laser Sintering (SLS), Direct Metal Laser Sintering (DMLS), Selective Laser Melting (SLM) and LaserCusing. In the exemplary embodiment, additive manufacturing system 100 includes a build platform 102, a powder bed 104, an energy source 106, an energy beam 108, a melt pool 110, a build layer 112, a component 114, a recoating device 116, and a housing 117 that contains components of additive manufacturing system 100. A longitudinal axis 103 of additive manufacturing system 100 extends through additive manufacturing system 100 in the direction of travel of recoating device 116. A transverse axis 105 extends in a plane substantially parallel to build platform 102 and normal to longitudinal axis 103. A vertical axis 107 extends in a direction that is normal to longitudinal axis 103 and normal to transverse axis 105. Longitudinal axis 103, transverse axis 105, and vertical axis 107 are orthogonal to each other.

Figure 2:
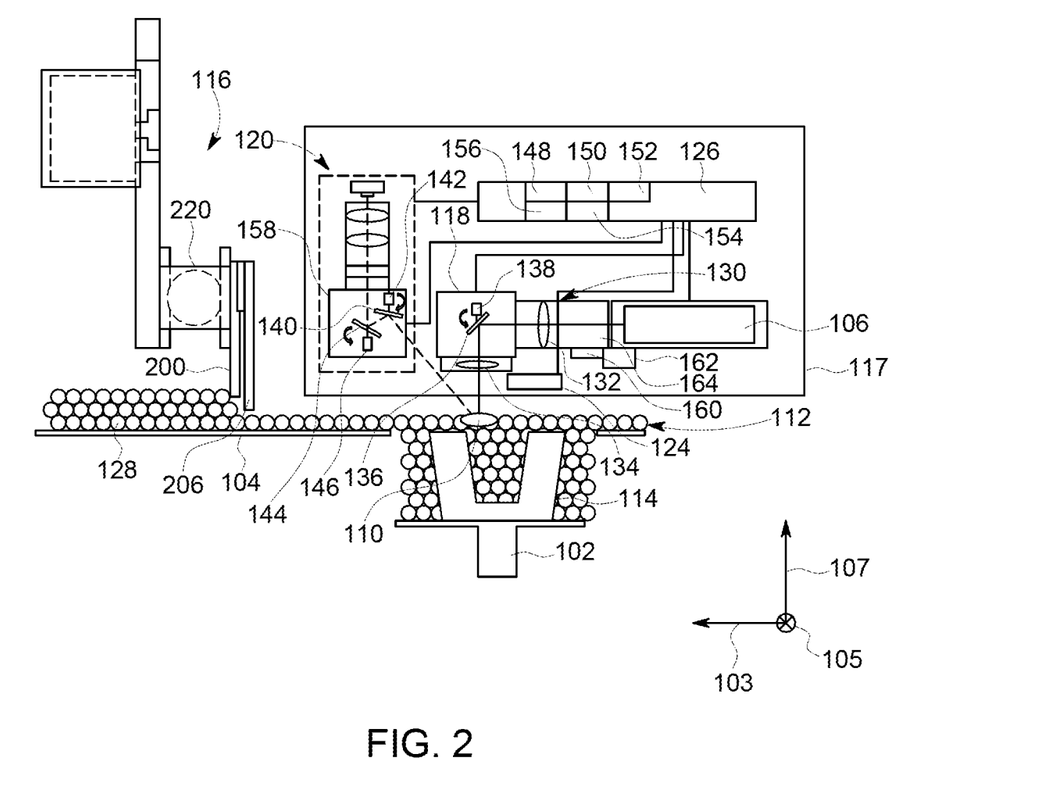
FIG. 2 is a schematic view of the additive manufacturing system shown in FIG. 1.

FIG. 2 is a schematic view of additive manufacturing system 100 utilizing a laser beam. In the exemplary embodiment, additive manufacturing system 100 includes a focused energy source 106, optical elements 130, a first scanning device 118, a second scanning device 158, housing 117, an optical system 120, recoating device 116, a particulate delivery system 124, and a controller 126. In alternative embodiments, additive manufacturing system 100 includes any component that facilitates operation of additive manufacturing system 100 as described herein. Additionally, in the exemplary embodiment, build platform 102 defines a powder bed 104 configured to hold particulates 128. In alternative embodiments, powder bed 104 is configured to have an atmosphere of argon. However, powder bed 104 may have an atmosphere of any inert gas which enables manufacturing system 100 to operate as described herein.

Also, in the exemplary embodiment, housing 117 provides a controlled environment for housing components of additive manufacturing system 100 such as particulate delivery system 124. Particulate delivery system 124 includes a dispenser 160 and a particulate supply 162. At least a portion of particulate delivery system 124 is enclosed within housing 117. In particular, dispenser 160 and particulate supply 162 are positioned within the controlled environment of housing 117 to inhibit exposure of particulates 128 to the ambient environment. In alternative embodiments, particulate delivery system 124 is positioned anywhere in additive manufacturing system 100 that facilitates additive manufacturing system 100 operating as described herein. In alternative embodiments, additive manufacturing system 100 includes any housing 117 that facilitates additive manufacturing system 100 operating as described herein.

In addition, in the exemplary embodiment, particulates 128 are powdered build materials that are melted and re-solidified during the additive manufacturing process to build a solid component. In the exemplary embodiment, particulates 128 include a gas-atomized alloy of any of the following: cobalt, iron, aluminum, titanium, nickel, and combinations thereof. In alternative embodiments, particulates 128 include any material that facilitates the operation of additive manufacturing system 100 as described herein. For example, in some embodiments, particulates 128 include, without limitation, any of the following: ceramic powders, metal-coated ceramic powders, thermoset resins, and thermoplastic resins. In further embodiments, additive manufacturing system 100 utilizes any number of particulates, e.g., first, second, third particulates, fourth particulates, etc.

In the exemplary embodiment, dispenser 160 is positioned above powder bed 104 and configured to deposit particulates 128 onto powder bed 104. In particular, dispenser 160 is coupled to particulate supply 162 and configured to dispense particulates 128 from particulate supply 160 onto powder bed 104. Accordingly, dispenser 160 facilitates depositing particulates 128 onto powder bed 104. In alternative embodiments, additive manufacturing system 100 includes any dispenser that facilitates the operation of additive manufacturing system 100 as described herein. For example, in some embodiments, particulate delivery system 124 includes a powder bed and a transfer mechanism to deposit at least the particulates 128 onto surface powder bed 104.

At least a portion of particulate delivery system 124 is configured to move relative to powder bed 104. In particular, particulate dispenser 160 is configured to move longitudinally relative to powder bed 104. In addition, particulate dispenser 160 is configured to move towards and away from powder bed 104. Accordingly, particulate delivery system 124 is configured to deposit at least particulates 128 in any pattern on powder bed 104. In alternative embodiments, particulate delivery system 124 is configured to move in any manner that facilitates the operation of additive manufacturing system 100 as described herein.

Also, in the exemplary embodiment, recoating device 116 is configured to displace particulates 128 when particulates 128 are on powder bed 104. For example, in some embodiments, recoating device 116 includes a tool configured to contact particulates 128 and thereby displace a portion of particulates 128. In the exemplary embodiment, recoating device 116 displaces particulates 128 to form desired shapes, such as recesses, in particulates 128 in order to form build layer 112 to fabricate component 114.

Figure 3:
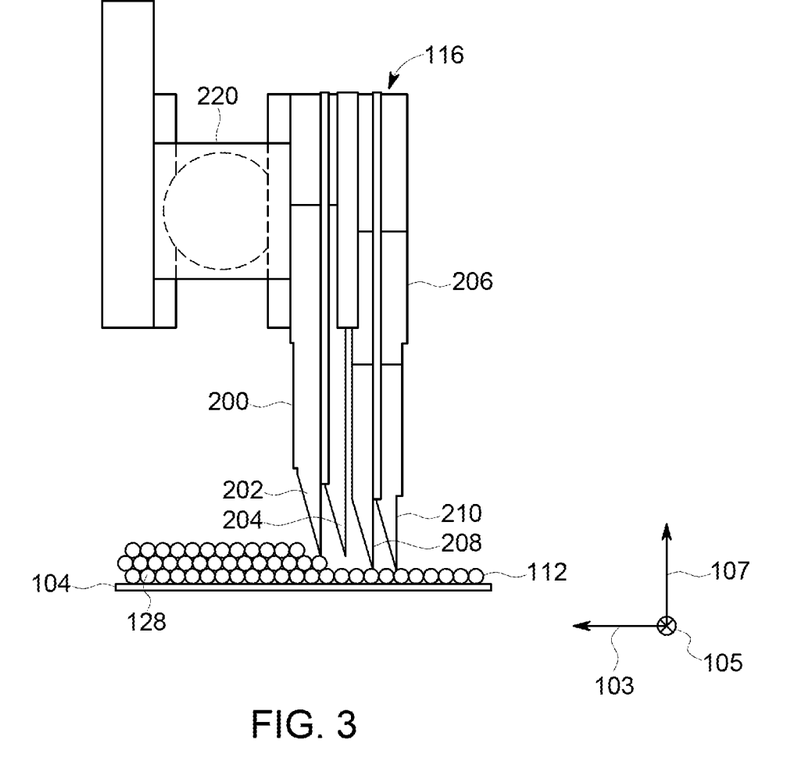
FIG. 3 is a schematic view of an exemplary recoating device that may be used with the additive manufacturing system shown in FIG. 2.

FIG. 3 is a schematic view of an exemplary recoating device 116. In the exemplary embodiment, recoating device 116 includes a first stage of recoater blades 200, a first row of first stage recoater blades 202, a second row of first stage recoater blades 204, a second stage of recoater blades 206, a first row of second stage recoater blades 208, a second row of second stage recoater blades 210, and a recoating device head 220. Recoating device head 220 facilitates changing the angle of recoating device 116, relative to powder bed 104. Additionally, in the exemplary embodiment, powder bed 104 is configured to hold particulates 128.

In addition, in the exemplary embodiment, recoating device 116 is configured to move relative to powder bed 104. In particular, recoating device 116 is configured to move longitudinally relative to powder bed 104. In addition, recoating device 116 is configured to move towards and away from powder bed 104. Accordingly, recoating device 116 is configured to displace any portion of particulates 128 on powder bed 104 in any direction in order to form build layer 112. In alternative embodiments, recoating device 116 is configured to move in any manner that facilitates the operation of additive manufacturing system 100 as described herein.

As shown in FIG. 3, recoating device 116 has displaced a portion of particulates 128. Recoating device 116 is configured to reduce undesirable disruption of particulates 128 during the recoating process. In the exemplary embodiment, recoating device 116 includes first stage of recoater blades 200 and second stage of recoater blades 206. Each of first stage of recoater blades 200 and second stage of recoater blades 206 includes a plurality of recoater blades 200. Recoating device 116 is configured such that first stage of recoater blades 200 is displaced from second stage of recoater blades 206 by a distance in both longitudinal dimension 103 and vertical dimension 107 that facilitates the displacement of particulates 128 by recoating device 116 in a sequentially progressive manner. Accordingly, recoating device 116 and particulate delivery system 124 facilitate building a component 114 from particulates 128. In alternative embodiments, recoating device 116 is configured in any manner that facilitates operation of recoating device 116 and additive manufacturing system 100 as described herein.

Figure 4:
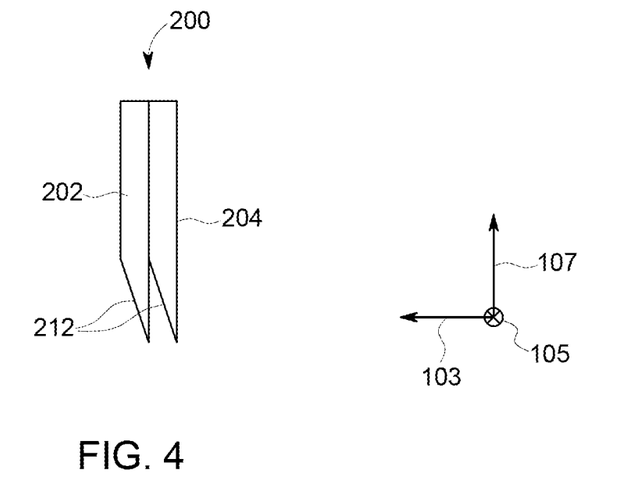
FIG. 4 is a schematic side view of an exemplary first stage of recoater blades that may be used with the recoating device shown in FIG. 3.
Figure 5:
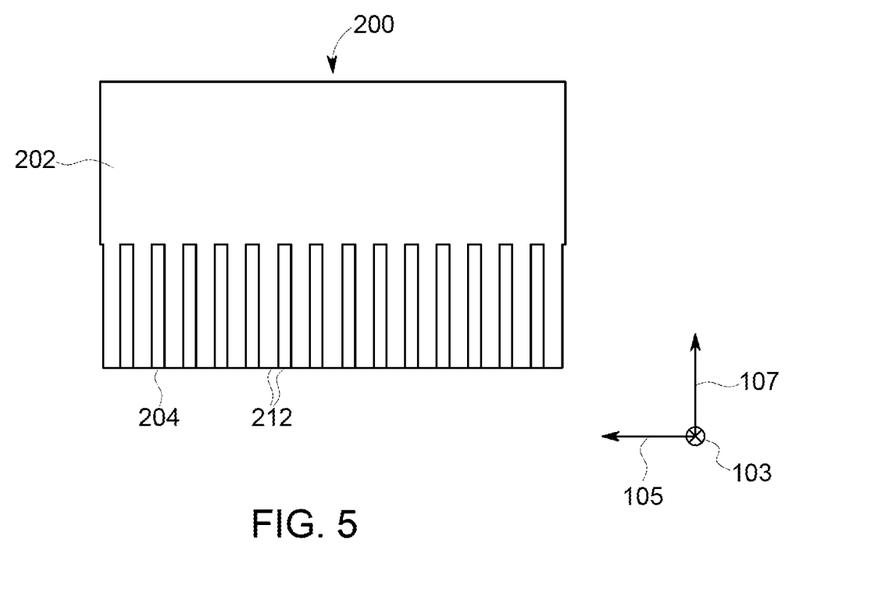
FIG. 5 is a schematic front view of the first stage of recoater blades shown in FIG. 4.

FIG. 4 is a schematic side view of first stage of recoater blades 200, first row of first stage recoater blades 202, second row of first stage recoater blades 204, and plurality of recoater blades 212. FIG. 5 is a schematic front view of recoater blades 200, first row of first stage recoater blades 202, second row of first stage recoater blades 204, and plurality of recoater blades 212. In the exemplary embodiment, referring to FIGS. 4 and 5, first row of first stage recoater blades 202 includes plurality of recoater blades 212. Each recoater blade 212 of first row of first stage recoater blades 202 is spaced apart in the transverse dimension from an adjacent recoater blade 212 of the plurality of recoater blades 212. Plurality of recoater blades 212 of first row of first stage recoater blades 202 at least partially define a first plane that is substantially parallel to the transverse dimension. Second row of first stage recoater blades 204 is configured substantially similar to first row of first stage recoater blades 202. Second row of first stage recoater blades 204 is coupled to recoating device 116 and is displaced from first row of first stage recoater blades 202 in the longitudinal dimension. Plurality of recoater blades 212 of second row of first stage recoater blades 204 are arranged such that no one of plurality of recoater blades 212 of second row of first stage recoater blades 204 is in direct longitudinal opposition to any one of plurality of recoater blades 212 of first row of first stage recoater blades 202. In alternative embodiments, first row of first stage recoater blades 202, second row of first stage recoater blades 204, first row of second stage recoater blades 208, and second row of second stage recoater blades 210 are configured in any manner that facilitates operation of recoating device and additive manufacturing system 100 as described herein.

In the exemplary embodiment, first row of first stage recoater blades 202 is coupled to second row of first stage recoater blades 204 to form first stage of recoater blades 200. A first row of second stage recoater blades 208 is configured substantially similar to first row of first stage recoater blades 202. A second row of second stage recoater blades 210 is configured substantially similar to second row of first stage recoater blades 204. First row of second stage recoater blades 208 is coupled to second row of second stage recoater blades 210 to form second stage of recoater blades 206. In alternative embodiments, first stage of recoater blades 200 and second stage of recoater blades 206 may include a third row of recoater blades, a fourth row of recoater blades, a fifth row of recoater blades, or as many additional rows of recoater blades 212 that facilitates first stage of recoater blades 200 and second stage of recoater blades 206 functioning as described herein.

Also, in the exemplary embodiment, second stage of recoater blades 206 is coupled to first stage of recoater blades 200, with second stage of recoater blades 206 being displaced from first stage of recoater blades 200 in the vertical and longitudinal dimensions. In alternative embodiments, recoating device 116 may include a third stage of recoater blades, a fourth stage of recoater blades, a fifth stage of recoater blades, or as many additional stages that facilitate functioning of recoating device 116 as described herein.

Further, in the exemplary embodiment, with reference to FIGS. 3-5, the staggered arrangement of recoater blades 212, with respect to paired rows of recoater blades within a stage of recoater blades, and the staggered arrangement of the stages of recoater blades, with respect to stages of recoater blades coupled together, is present to decrease the occurrence of undesirable displacements of particulates 128 within powder bed 104 during the recoating operation. The staggered arrangement of recoating blades 212 within the rows and between the stages of recoating device 116 enables the displacement of particulates 128 during operation of additive manufacturing system 100 to occur progressively and uniformly. In alternative embodiments, the staggered arrangement of recoating blades 212 within the rows and between the stages of recoating device 116 may take any form that enables recoating device 116 and additive manufacturing system 100 to function as described herein.

Figure 6:
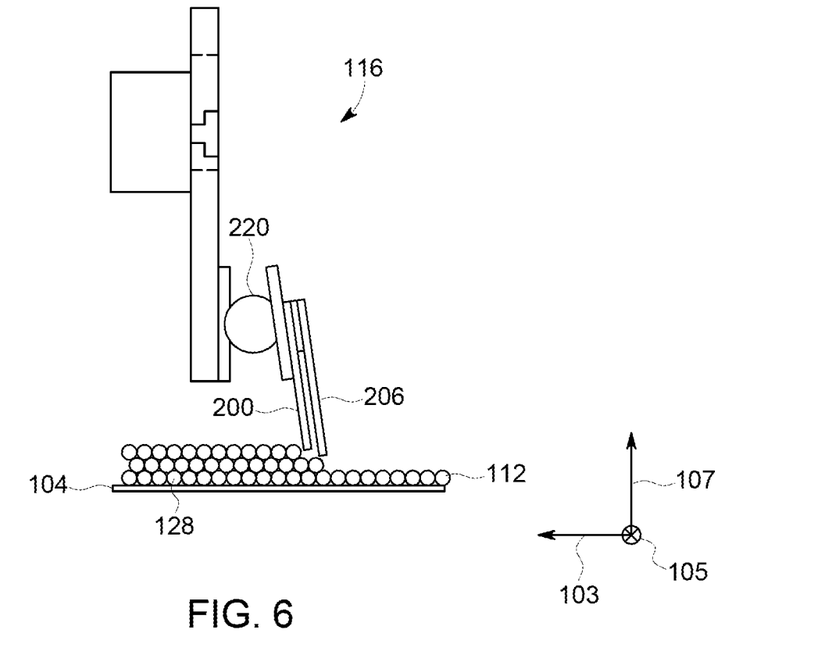
FIG. 6 is a schematic view of the additive manufacturing system shown in FIG. 1 with the addition of an adjustable angle recoating device.

In another embodiment, FIG. 6 is a schematic view of an exemplary recoating device 116 with the angle of recoating device 116 changed via recoating device head 220 to facilitate an alternative method for displacement of particulates 128.

In the exemplary embodiment, recoater blade 212 is of a material that enables recoating device 116 and additive manufacturing system 100 to operate as described herein. In further embodiments, recoater blade 212 is of a material that is of a predetermined stiffness in a range of about 0.1 lb/in. to about 100 lb/in., enabling recoater blade 212 to flex when encountering rigid obstacles, such as raised areas of melted particulates 128. In another embodiment, recoater blade 212 is of a material that is of a compatible metallurgical nature with particulates 128.

In the exemplary embodiment, recoater blade 212 has a substantially rectangular cross-sectional shape with a pointed tip region. In other embodiments, recoater blade 212 may have a cross-sectional shape that is one of substantially cylindrical, ovular, triangular, tear-dropped, or airfoil. In another embodiment, recoater blade 212 has a cross-sectional shape that enables recoating device 116 and additive manufacturing system 100 to operate as described herein.

In reference to FIG. 1, in the exemplary embodiment, energy source 106 is configured to heat particulates 128. Focused energy source 106 is optically coupled to optical elements 130 and first scanning device 118. Optical elements 130 and first scanning device 118 are configured to facilitate controlling the scanning of energy source 106. In the exemplary embodiment, energy source 106 is a laser device such as a yttrium-based solid state laser configured to emit a laser beam 164 having a wavelength of about 1070 nanometers (nm). In alternative embodiments, additive manufacturing system 100 includes any energy source 106 that facilitates operation of additive manufacturing system 100 as described herein. For example, in some embodiments, additive manufacturing system 100 includes a first energy source 106 having a first power and a second energy source 106 having a second power different from the first power. In further embodiments, additive manufacturing system 100 includes at least two energy sources 106 having substantially the same power output. In further embodiments, additive manufacturing system 100 includes at least one energy source 106 that is an electron beam generator. In some embodiments, additive manufacturing system 100 includes a diode fiber laser array (not shown) including a plurality of diode lasers and a plurality of optical fibers. In such embodiments, the diode fiber array simultaneously directs laser beams from optical fibers towards powder bed 104 to heat particulates 128.

Moreover, in the exemplary embodiment, optical elements 130 facilitate focusing beam 164 on powder bed 104. In the exemplary embodiment, optical elements 130 include a beam collimator 132 disposed between energy source 106 and first scanning device 118, and an F-theta lens 134 disposed between first scanning device 118 and powder bed 104. In alternative embodiments, additive manufacturing system 100 includes any optical element that facilitates operation of additive manufacturing system 100 as described herein.

During operation, in the exemplary embodiment, first scanning device 118 is configured to direct beam 164 across selective portions of powder bed 104 to create a solid component 114. In the exemplary embodiment, first scanning device 118 is a galvanometer scanning device including a mirror 136 operatively coupled to a galvanometer-controlled motor 138 (broadly, an actuator). Motor 138 is configured to move (specifically, rotate) mirror 136 in response to signals received from controller 126, and thereby deflect beam 164 towards and across selective portions of powder bed 104. In some embodiments, mirror 136 includes a reflective coating that has a reflectance spectrum that corresponds to the wavelength of beam 164. In alternative embodiments, additive manufacturing system 100 includes any scanning device that facilitates operation of additive manufacturing system 100 as described herein. For example, in some embodiments, first scanning device 118 includes two mirrors and two galvanometer-controlled motors, each motor operatively coupled to one of the mirrors. In further embodiments, first scanning device 118 includes, without limitation, any of the following: two-dimension (2D) scan galvanometers, three-dimension (3D) scan galvanometers, and dynamic focusing galvanometers.

Also, in the exemplary embodiment, optical system 120 is configured to facilitate monitoring a melt pool 110 created by beam 164. In particular, optical system 120 is configured to detect electromagnetic radiation generated by melt pool 110 and transmit information about melt pool 110 to controller 126. More specifically, optical system 120 is configured to receive EM radiation generated by melt pool 110, and generate an electrical signal in response thereto. Optical system 120 is communicatively coupled to controller 126, and is configured to transmit electrical signals to controller 126. In alternative embodiments, additive manufacturing system 100 includes any optical system 120 that facilitates operation of additive manufacturing system 100 as described herein. For example, in some embodiments, optical system 120 includes, without limitation, any of the following: a photomultiplier tube, a photodiode, an infrared camera, a charged-couple device (CCD) camera, a CMOS camera, a pyrometer, or a high-speed visible-light camera. In further embodiments, optical system 120 is configured to detect EM radiation within an infrared spectrum and EM radiation within a visible-light spectrum. In some embodiments, optical system 120 includes a beam splitter (not shown) configured to divide and deflect EM radiation from melt pool 110 to corresponding optical detectors.

While optical system 120 is described as including "optical" detectors for EM radiation generated by melt pool 110, it should be noted that use of the term "optical" is not equated with the term "visible." Rather, optical system 120 is configured to capture a wide spectral range of EM radiation. For example, in some embodiments, optical system 120 is sensitive to light with wavelengths in the ultraviolet spectrum (about 200-400 nm), the visible spectrum (about 400-700 nm), the near-infrared spectrum (about 700-1,200 nm), and the infrared spectrum (about 1,200-10,000 nm). Further, because the type of EM radiation emitted by melt pool 110 depends on the temperature of melt pool 110, optical system 120 is capable of monitoring and measuring both a size and a temperature of melt pool 110.

Also in the exemplary embodiment, optical system 120 includes second scanning device 158 which is configured to direct EM radiation generated by melt pool 110. In the exemplary embodiment, second scanning device 158 is a galvanometer scanning device including a first mirror 140 operatively coupled to a first galvanometer-controlled motor 142 (broadly, an actuator), and a second mirror 144 operatively coupled to a second galvanometer-controlled motor 146 (broadly, an actuator). First motor 142 and second motor 146 are configured to move (specifically, rotate) first mirror 140 and second mirror 144, respectively, in response to signals received from controller 126 to deflect EM radiation from melt pool 110 to optical system 120. In some embodiments, one or both of first mirror 140 and second mirror 144 includes a reflective coating that has a reflectance spectrum that corresponds to EM radiation that optical system 120 is configured to detect. In alternative embodiments, additive manufacturing system 100 includes any scanning device that facilitates operation of additive manufacturing system 100 as described herein.

Additive manufacturing system 100 is operated to fabricate a component 114 by a layer-by-layer manufacturing process. Component 114 is fabricated from an electronic representation of the 3D geometry of the component 114. In some embodiments, the electronic representation is produced in a computer aided design (CAD) or similar file. In alternative embodiments, the electronic representation is any electronic representation that facilitates operation of additive manufacturing system 100 as described herein. In the exemplary embodiment, the CAD file of component 114 is converted into a layer-by-layer format that includes a plurality of build parameters for each build layer 112. In the exemplary embodiment, component 114 is arranged electronically in a desired orientation relative to the origin of the coordinate system used in additive manufacturing system 100. The geometry of component 114 is sliced into a stack of build layers 112 of a desired thickness, such that the geometry of each build layer 112 is an outline of the cross-section through component 114 at that particular build layer 112 location. A "toolpath" or "toolpaths" are generated across the geometry of a respective build layer 112. The build parameters are applied along the toolpath or toolpaths to fabricate that build layer 112 of component 114 from the material used to construct component 114. The steps are repeated for each respective build layer 112 of component 114 geometry. Once the process is completed, an electronic computer build file (or files) is generated including all of build layers 112. The build file is loaded into controller 126 of additive manufacturing system 100 to control the system during fabrication of each build layer 112.

After the build file is loaded into controller 126, additive manufacturing system 100 is operated to generate component 114 by implementing the layer-by-layer manufacturing process, such as a DMLM method. The exemplary layer-by-layer additive manufacturing process does not use a pre-existing article as the precursor to final component 114, rather the process produces component 114 from a raw material in a configurable form, such as particulates 128. For example, without limitation, a steel component 114 is additively manufactured using a steel powder. Additive manufacturing system 100 facilitates fabrication of components 114 using a broad range of materials, for example, without limitation, metals, ceramics, and polymers. In alternative embodiments, DMLM fabricates components 114 from any materials that facilitate operation of additive manufacturing system 100 as described herein.

As used herein, the term "parameter" refers to characteristics that are used to define the operating conditions of additive manufacturing system 100, such as a power output of energy source 106, a vector scanning speed of energy source 106, a raster power output of energy source 106, a raster scanning speed of energy source 106, a raster tool path of energy source 106, and a contour power output of energy source 106 within additive manufacturing system 100. In some embodiments, the parameters are initially input by a user into controller 126. The parameters represent a given operating state of additive manufacturing system 100. In general, during raster scanning, beam 164 is scanned sequentially along a series of substantially straight lines spaced apart and parallel to each other. During vector scanning, beam 164 is generally scanned sequentially along a series of substantially straight lines or vectors, where the orientation of the vectors relative to each other sometimes varies. In general, the ending point of one vector coincides with the beginning point of the next vector. Vector scanning is generally used to define the outer contours of component 114, whereas raster scanning is generally used to "fill" the spaces enclosed by the contour, where component 114 is solid.

In the exemplary embodiment, controller 126 is coupled to particulate delivery system 124 and energy source 106. Controller 126 includes a memory device 148 and processor 150 coupled to memory device 148. In some embodiments, processor 150 includes one or more processing units, such as, without limitation, a multi-core configuration. In the exemplary embodiment, processor 150 includes a field programmable gate array (FPGA). Alternatively, processor 150 is any type of processor that permits controller 126 to operate as described herein. In some embodiments, executable instructions are stored in memory device 148. Controller 126 is configurable to perform one or more operations described herein by programming processor 150. For example, processor 150 is programmed by encoding an operation as one or more executable instructions and providing the executable instructions in memory device 148. In the exemplary embodiment, memory device 148 is one or more devices that facilitate storage and retrieval of information such as executable instructions or other data. In some embodiments, memory device 148 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, memory device 148 is configured to store build parameters including, without limitation, real-time and historical build parameter values, or any other type of data. In alternative embodiments, memory device 148 stores any data that facilitates the operation of additive manufacturing system 100 as described herein. In some embodiments, processor 150 removes or "purges" data from memory device 148 based on the age of the data. For example, processor 150 overwrites previously recorded and stored data associated with a subsequent time or event. In addition, or alternatively, processor 150 removes data that exceeds a predetermined time interval. In addition, memory device 148 includes, without limitation, sufficient data, algorithms, and commands to facilitate monitoring and measuring of build parameters and the geometric conditions of the component fabricated by additive manufacturing system 100.

In some embodiments, controller 126 includes a presentation interface 152 coupled to processor 150. Presentation interface 152 presents information, such as images, to a user. In one embodiment, presentation interface 152 includes a display adapter (not shown) coupled to a display device (not shown), such as a cathode ray tube (CRT), a liquid crystal display (LCD), an organic LED (OLED) display, or an "electronic ink" display. In some embodiments, presentation interface 152 includes one or more display devices. In addition, or alternatively, presentation interface 152 includes an audio output device (not shown), for example, without limitation, an audio adapter or a speaker (not shown).

In some embodiments, controller 126 includes a user input interface 154. In the exemplary embodiment, user input interface 154 is coupled to processor 150 and receives input from the user. In some embodiments, user input interface 154 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 152 and user input interface 154.

In the exemplary embodiment, a communication interface 156 is coupled to processor 150 and is configured to couple in communication with one or more other devices, such as particulate delivery system 124, and to perform input and output operations with respect to such devices while performing as an input channel. For example, in some embodiments, communication interface 156 includes, without limitation, a wired network adapter, a wireless network adapter, a mobile telecommunications adapter, a serial communication adapter, or a parallel communication adapter. Communication interface 156 receives a data signal from or transmits a data signal to one or more remote devices.

Presentation interface 152 and communication interface 156 are both capable of providing information for use with the methods described herein, such as, providing information to the user and/or processor 150. Accordingly, presentation interface 152 and communication interface 156 are referred to as output devices. Similarly, user input interface 154 and communication interface 156 are capable of receiving information for use with the methods described herein and are referred to as input devices.

Figure 7:
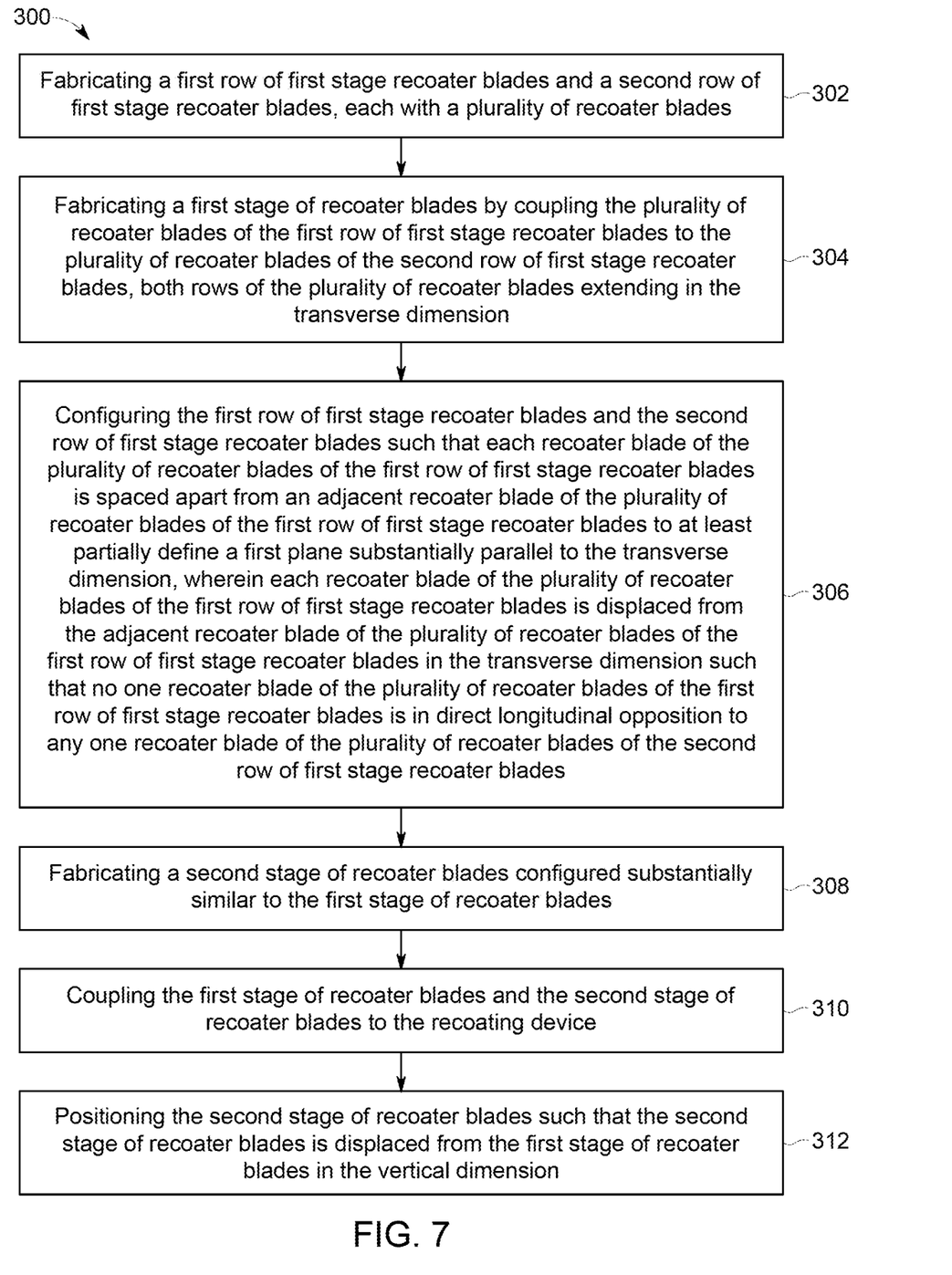
FIG. 7 is a flow diagram illustrating exemplary steps of the exemplary method of assembling the additive manufacturing system shown in FIGS. 1-2.

FIG. 7 is a flow diagram illustrating the exemplary method 300 of assembling an additive manufacturing system 100 (shown in FIGS. 1 and 2). Method 300 includes manufacturing a recoating device 116 by fabricating 302 first row of first stage recoater blades 202 and second row of first stage recoater blades 204, each with plurality of recoater blades 212.

Once first row of first stage recoater blades 202 and second row of first stage recoater blades 204 are fabricated, fabricating 304 first stage of recoater blades 200 by coupling plurality of recoater blades 212 of first row of first stage recoater blades 202 to plurality of recoater blades 212 of second row of first stage recoater blades 204 is completed. Both rows of plurality of recoater blades 212 extend in the transverse dimension.

Also, once first stage of recoater blades 200 is fabricated, configuring 306 first row of first stage recoater blades 202 and second row of first stage recoater blades 204 is completed. Each recoater blade 212 of plurality of recoater blades 212 of first row of first stage recoater blades 202 is spaced apart from an adjacent recoater blade 212 of plurality of recoater blades 212 of first row of first stage recoater blades 202 to at least partially define a first plane that is substantially parallel to the transverse dimension. Each recoater blade 212 of plurality of recoater blades 212 of first row of first stage recoater blades 202 is displaced from adjacent recoater blade 212 of plurality of recoater blades 212 of first row of first stage recoater blades 202 in the transverse dimension such that no one recoater blade 212 of plurality of recoater blades 212 of first row of first stage recoater blades 202 is in direct longitudinal opposition to any one recoater blade 212 of plurality of recoater blades 212 of second row of first stage recoater blades 204.

Further, once first row of first stage recoater blades 202 and second row of first stage recoater blades 204 are configured, fabricating 308 second stage of recoater blades 206 is completed. Plurality of recoater blades 212 are configured substantially similar to plurality of recoater blades of first stage of recoater blades 200 to form second stage of recoater blades 206. After second stage of recoater blades 206 is fabricated, coupling 310 first stage of recoater blades 200 and second stage of recoater blades 206 to recoating device 116 is completed.

Embodiments of the additive manufacturing systems with a recoating device described herein recoat a component with particulate material during the build process. The additive manufacturing system includes a focused energy source and a recoating device with multiple stages of multi-row blades. The focused energy source directs energy to a layer of particulate build material that covers the component being constructed. After the build layer is melted by the energy source and allowed to cool, the recoating device spreads particulate material across the component to form the next build layer. The multiple stages of multiple row blades spread the particulate material in a progressive manner. The progressive multiple-stage recoating device decreases build time and cost, and reduces the presence of inconsistencies in the particulate build layer.

An exemplary technical effect of the methods and systems described herein includes: (a) recoating an additive manufacturing component with a multiple stage, multiple blade set recoating device; (b) decreasing the build time of a component; and (c) reducing defects in a component.

Exemplary embodiments of additive manufacturing systems including a recoating device are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the technology may be shown in some drawings and not in others, this is for convenience only. In accordance with the principles of the invention, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A recoating device for an additive manufacturing system, the additive manufacturing system defining a longitudinal dimension, a transverse dimension, and a vertical dimension, the three dimensions orthogonal to each other, said recoating device comprising:
   a plurality of recoater blades comprising:
      a first stage of said plurality of recoater blades comprising a plurality of rows of said plurality of recoater blades extending in the transverse dimension; and
      a second stage of said plurality of recoater blades configured substantially similar to said first stage of said plurality of recoater blades, wherein said second stage of said plurality of recoater blades is displaced from said first stage of said plurality of recoater blades in the vertical dimension.

2. The recoating device in accordance with claim 1, wherein said first stage of said plurality of recoater blades and said second stage of said plurality of recoater blades comprises:
   a first row of said plurality of recoater blades extending in the transverse dimension; and
   a second row of said plurality of recoater blades extending in the transverse dimension, each recoater blade of said first row of said plurality of recoater blades spaced apart from an adjacent recoater blade of said first row of said plurality of recoater blades to at least partially define a first plane substantially parallel to the transverse dimension, wherein each recoater blade of said first row of said plurality of recoater blades is displaced from said adjacent recoater blade of said second row of said plurality of recoater blades in the transverse dimension such that no one said recoater blade of said first row of said plurality of recoater blades is in direct longitudinal opposition to any one said recoater blade of said second row of said plurality of recoater blades.

3. The recoating device in accordance with claim 2, wherein said plurality of recoater blades comprises a material of predetermined flexibility.

4. The recoating device in accordance with claim 3, wherein:
   said first row of said plurality of recoater blades and said second row of said plurality of recoater blades define a gap therebetween in the longitudinal plane; and
   said each recoater blade of said first row of said plurality of recoater blades is configured to flex in the longitudinal plane such that the gap with an opposing recoater blade of said second row of said plurality of recoater blades varies, said first row of said plurality of recoater blades displaced from said second row of said plurality of recoater blades such that said first row of said plurality of recoater blades does not contact said second row of said plurality of recoater blades as said each recoater blade of said first row of said plurality of recoater blades flexes.

5. The recoating device in accordance with claim 2, wherein said recoating device further comprises a recoating device head, said recoating device head configured to facilitate changing an angle of said first row of said plurality of recoater blades and said second row of said plurality of recoater blades.

6. The recoating device in accordance with claim 2, wherein:
said first row of said plurality of recoater blades have a first height; and
said second row of said plurality of recoater blades have a second height.

7. The recoating device in accordance with claim 1, wherein said plurality of recoater blades have a cross-sectional shape that is one of substantially cylindrical, ovular, triangular, tear-dropped, rectangular, and airfoil.

8. The recoating device in accordance with claim 1, wherein said recoating device further comprises a recoating device head, said recoating device head configured to facilitate changing an angle of said first stage and said second stage.

9. An additive manufacturing system, said additive manufacturing system defining a longitudinal dimension, a transverse dimension, and a vertical dimension, the three dimensions orthogonal to each other, said additive manufacturing system comprising:
a powder bed configured to hold a powder for forming a component;
at least one energy source configured to produce at least one energy beam configured to generate a melt pool in said powder bed; and
a recoating device configured to distribute powder for forming a build layer of a component from said powder bed, said recoating device comprising:
a plurality of recoater blades comprising:
a first stage of said plurality of recoater blades comprising a plurality of rows of said plurality of recoater blades extending in the transverse dimension; and
a second stage of said plurality of recoater blades configured substantially similar to said first stage of said plurality of recoater blades, wherein said second stage of said plurality of recoater blades is displaced from said first stage of said plurality of recoater blades in the vertical dimension.

10. The additive manufacturing system of claim 9, wherein said first stage of said plurality of recoater blades and said second stage of said plurality of recoater blades comprises:
a first row of said plurality of recoater blades extending in the transverse dimension; and
a second row of said plurality of recoater blades extending in the transverse dimension, each recoater blade of said first row of said plurality of recoater blades spaced apart from an adjacent recoater blade of said first row of said plurality of recoater blades to at least partially define a first plane substantially parallel to the transverse dimension, wherein each recoater blade of said first row of said plurality of recoater blades is displaced from said adjacent recoater blade of said second row of said plurality of recoater blades in the transverse dimension such that no one said recoater blade of said first row of said plurality of recoater blades is in direct longitudinal opposition to any one said recoater blade of said second row of said plurality of recoater blades.

11. The additive manufacturing system of claim 10, wherein said plurality of recoater blades comprises a material of predetermined flexibility.

12. The additive manufacturing system of claim 11, wherein:
said first row of said plurality of recoater blades and said second row of said plurality of recoater blades define a gap therebetween in the longitudinal plane; and
said each recoater blade of said first row of said plurality of recoater blades is configured to flex in the longitudinal plane such that the gap with an opposing recoater blade of said second row of said plurality of recoater blades varies, said first row of said plurality of recoater blades displaced from said second row of said plurality of recoater blades such that said first row of said plurality of recoater blades does not contact said second row of said plurality of recoater blades as said each recoater blade of said first row of said plurality of recoater blades flexes.

13. The additive manufacturing system of claim 9, wherein said plurality of recoater blades have a cross-sectional shape that is one of substantially cylindrical, ovular, triangular, tear-dropped, rectangular, and airfoil.

14. The additive manufacturing system of claim 9, wherein said recoating device is configured to rotate about an axis defined substantially parallel to the transverse dimension relative to said additive manufacturing system.

15. The additive manufacturing system of claim 9, wherein said recoating device further comprises a recoating device head, said recoating device head configured to facilitate changing an angle of said first stage and said second stage.

16. A method of assembling an additive manufacturing system comprising manufacturing a recoating device configured to distribute powder for forming a build layer of a component, the additive manufacturing system defining a longitudinal dimension, a transverse dimension, and a vertical dimension, the three dimensions orthogonal to each other, said method further comprising:
fabricating a plurality of rows of a plurality of recoater blades extending in the transverse dimension;
fabricating a first stage of recoater blades comprising coupling at least a first portion of the plurality of rows of the plurality of recoater blades to each other;
fabricating a second stage of recoater blades comprising coupling at least a second portion of the plurality of rows of the plurality of recoater blades to each other, the second stage of recoater blades configured substantially similar to the first stage of recoater blades;
coupling the first stage of recoater blades and the second stage of recoater blades to the recoating device; and
positioning the second stage of recoater blades such that the second stage of recoater blades is displaced from the first stage of recoater blades in the vertical dimension.

17. The method of claim 16 further comprising:
fabricating a first row of first stage recoater blades and a second row of first stage recoater blades, each with a plurality of recoater blades;
fabricating a first stage of recoater blades by coupling the plurality of recoater blades of the first row of first stage recoater blades to the plurality of recoater blades of the second row of first stage recoater blades, both rows of the plurality of recoater blades extending in the transverse dimension; and
configuring the first row of first stage recoater blades and the second row of first stage recoater blades such that each recoater blade of the plurality of recoater blades of the first row of first stage recoater blades is spaced apart from an adjacent recoater blade of the plurality of recoater blades of the second row of first stage recoater blades to at least partially define a first plane substantially parallel to the transverse dimension, wherein each recoater blade of the plurality of recoater blades of the first row of first stage recoater blades is displaced from the adjacent recoater blade of the plurality of recoater blades of the first row of first stage recoater blades in the transverse dimension such that no one recoater blade of the plurality of recoater blades of the first row of first stage recoater blades is in direct longitudinal opposition to any one recoater blade of the plurality of recoater blades of the second row of first stage recoater blades.

18. The method of claim 16 further comprising forming the plurality of recoater blades with a material of predetermined flexibility.

19. The method of claim 16 further comprising forming the plurality of recoater blades with a cross-sectional shape that is one of substantially cylindrical, ovular, triangular, tear-dropped, rectangular, and airfoil.

20. The method of claim 16 further comprising:
fabricating a recoating head; and
configuring the recoating head to change an angle of the first stage relative to the additive manufacturing system.

* * * * *